United States Patent
Wu et al.

(10) Patent No.: US 10,607,005 B2
(45) Date of Patent: Mar. 31, 2020

(54) SYSTEMS AND METHODS FOR LABELING AUTOMATICALLY GENERATED REPORTS

(71) Applicant: Symantec Corporation, Mountain View, CA (US)

(72) Inventors: Shuning Wu, Mountain View, CA (US); Wangyan Feng, Mountain View, CA (US); Ningwei Liu, Palo Alto, CA (US); Kevin Roundy, Culver City, CA (US)

(73) Assignee: CA, Inc., San Jose, CA (US)

( * ) Notice: Subject to any disclaimer, the term of this patent is extended or adjusted under 35 U.S.C. 154(b) by 256 days.

(21) Appl. No.: 15/627,778

(22) Filed: Jun. 20, 2017

(65) Prior Publication Data
US 2018/0365417 A1    Dec. 20, 2018

(51) Int. Cl.
*G06F 21/00* (2013.01)
*G06F 21/55* (2013.01)
(Continued)

(52) U.S. Cl.
CPC .......... *G06F 21/552* (2013.01); *G06F 17/241* (2013.01); *G06F 21/554* (2013.01); *G06N 20/00* (2019.01)

(58) Field of Classification Search
None
See application file for complete search history.

(56) References Cited

U.S. PATENT DOCUMENTS

2007/0283192 A1* 12/2007 Shevchenko ......... G06F 21/554
  714/39
2010/0180344 A1  7/2010 Malyshev et al.
(Continued)

FOREIGN PATENT DOCUMENTS

WO    2013036269 A1    3/2013
WO    2018/236772 A1    12/2018

OTHER PUBLICATIONS

Wikipedia; Latent Dirichlet allocation, https://en.wikipedia.org/wiki/Latent_Dirichlet_allocation; As accessed on May 17, 2017.
(Continued)

*Primary Examiner* — Andrew J Steinle
(74) *Attorney, Agent, or Firm* — FisherBroyles, LLP

(57) ABSTRACT

The disclosed computer-implemented method for labeling automatically generated reports may include (i) identifying incident reports that describe incidents that each involve at least one computing system and that comprise automatically collected information about the incidents and a manually analyzed subset of incident reports that comprise manually generated information, (ii) assigning at least one label to at least one incident report in the manually analyzed subset based on applying a machine learning model to the manually generated information, (iii) deriving, from the automatically collected information, a set of features that describe incident reports, (iv) propagating at least one label from a labeled incident report to an incident report that is not in the manually analyzed subset and that comprises similar features with the labeled incident report, and (v) performing an action related to the label on the incident report. Various other methods, systems, and computer-readable media are also disclosed.

20 Claims, 7 Drawing Sheets

(51) Int. Cl.
G06F 17/24 (2006.01)
G06N 20/00 (2019.01)

(56) References Cited

U.S. PATENT DOCUMENTS

2011/0283361 A1* 11/2011 Perdisci .................. G06F 21/56
726/24
2016/0072836 A1* 3/2016 Hadden ............... H04L 63/1441
726/23
2017/0251006 A1* 8/2017 LaRosa .............. H04L 63/1425

OTHER PUBLICATIONS

Li et at.; Unsupervised Feature Selection Using Nonnegative Spectral Analysis; https://www.aaai.org/ocs/index.php/AAAI/AAAI12/paper/view/4955; Jul. 14, 2012.
International Search Report and Written Opinion received for PCT Application Serial No. PCT/US2018/038132 dated Aug. 21, 2018, 8 pages.

* cited by examiner

SYSTEMS AND METHODS FOR LABELING AUTOMATICALLY GENERATED REPORTS

BACKGROUND

On an individual scale, a user can secure a computing device by installing and regularly updating a suite of anti-malware products, and investigating any reports produced by the anti-malware products about suspicious activity on the computing device. On an enterprise scale, an administrator may be responsible for large numbers of computing devices and networks that each have a suite of security products installed that generate reports. In some cases, a single administrator may be responsible for hundreds of physical and virtual computing systems across dozens of networks that collectively generate thousands of incident reports, only some of which indicate genuine malicious activity. In some instances, an incident report may indicate malicious activity that was handled by automated systems, such as a virus download that was successfully blocked. Only a few reports out of thousands may contain information that needs to be assessed and acted upon by an administrator.

Unfortunately, some traditional systems for analyzing incident reports may not have any method in place for sorting severe incidents that require human attention from benign or minor incidents that can be safely ignored. Other traditional systems may have labeling methods with high rates of false positives, which waste time, or false negatives, which endanger security. The instant disclosure, therefore, identifies and addresses a need for systems and methods for labeling automatically generated reports.

SUMMARY

As will be described in greater detail below, the instant disclosure describes various systems and methods for labeling automatically generated reports.

In one example, a computer-implemented method for labeling automatically generated reports may include (i) identifying a set of incident reports that describe incidents that each involve at least one computing system and that include automatically collected information about the incidents and a manually analyzed subset of the set of incident reports that include manually generated information about the incidents, (ii) assigning at least one label from a set of labels to at least one incident report in the manually analyzed subset of the set of incident reports based on applying a machine learning model to the manually generated information, (iii) deriving, from the automatically collected information, a set of features that describe the set of incident reports, (iv) propagating at least one label within the set of labels from a labeled incident report in the manually analyzed subset of the set of incident reports to an incident report that is not in the manually analyzed subset and that includes similar features from the set of features with the labeled incident report, and (v) performing an action related to the label on the incident report that is not in the manually analyzed subset in response to propagating the label to the incident report.

In some examples, performing the action may include forwarding the incident report to an analyst for manual analysis. Additionally or alternatively, performing the action may include propagating at least one manually added note from the labeled incident report to the incident report.

In one embodiment, the incidents may include security incidents and the set of incident reports may include incident reports generated by security applications. In some embodiments, assigning at least one label from a set of labels to at least one incident report in the manually analyzed subset of the set of incident reports based on applying the machine learning model to the manually generated information may include analyzing the manually generated information using a natural language processing technique.

In one embodiment, deriving, from the automatically collected information, the set of features that describe the set of incident reports may include deriving an original set of features from the set of incident reports and refining, using a machine learning model, the original set of features into a reduced set of features that includes a subset of the original set of features that differentiates between incident reports of different types more effectively than a subset of the original features not in the reduced set of features. In some examples, propagating at least one label from the labeled incident report to the incident report that may include similar features with the labeled incident report may include plotting each incident report in the set of incident reports on a graph based on at least one value for the incident report of at least one feature in the set of features and propagating at least one label from the labeled incident report to the incident report in response to determining that the labeled incident report and the incident report are plotted within a predetermined distance of each other in the graph.

In some examples, assigning at least one label from a set of labels to at least one incident report in the manually analyzed subset of the set of incident reports may include labeling at least one incident report in the manually analyzed subset as severe and/or labeling at least one additional incident report in the manually analyzed subset as not severe. In some examples, performing the action may include forwarding the incident report labeled as severe to an analyst for manual analysis in response to labeling the incident report as severe and/or avoiding forwarding the additional incident report labeled as not severe to an analyst for manual analysis in response to labeling the additional incident report as not severe.

In one embodiment, a system for implementing the above-described method may include (i) an identification module, stored in memory, that identifies a set of incident reports that describe incidents that each involve at least one computing system and that include automatically collected information about the incidents and a manually analyzed subset of the set of incident reports that include manually generated information about the incidents, (ii) an assignment module, stored in memory, that assigns at least one label from a set of labels to at least one incident report in the manually analyzed subset of the set of incident reports based on applying a machine learning model to the manually generated information, (iii) a deriving module, stored in memory, that derives, from the automatically collected information, a set of features that describe the set of incident reports, (iv) a propagation module, stored in memory, that propagates at least one label within the set of labels from a labeled incident report in the manually analyzed subset of the set of incident reports to an incident report that is not in the manually analyzed subset and that includes similar features from the set of features with the labeled incident report, (v) a performing module, stored in memory, that performs an action related to the label on the incident report that is not in the manually analyzed subset in response to propagating the label to the incident report, and (vi) at least one physical processor configured to execute the identification module, the assignment module, the deriving module, the propagation module, and the performing module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) identify a set of incident reports that describe incidents that each involve at least one computing system and that include automatically collected information about the incidents and a manually analyzed subset of the set of incident reports that include manually generated information about the incidents, (ii) assign at least one label from a set of labels to at least one incident report in the manually analyzed subset of the set of incident reports based on applying a machine learning model to the manually generated information, (iii) derive, from the automatically collected information, a set of features that describe the set of incident reports, (iv) propagate at least one label within the set of labels from a labeled incident report in the manually analyzed subset of the set of incident reports to an incident report that is not in the manually analyzed subset and that includes similar features from the set of features with the labeled incident report, and (v) perform an action related to the label on the incident report that is not in the manually analyzed subset in response to propagating the label to the incident report.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
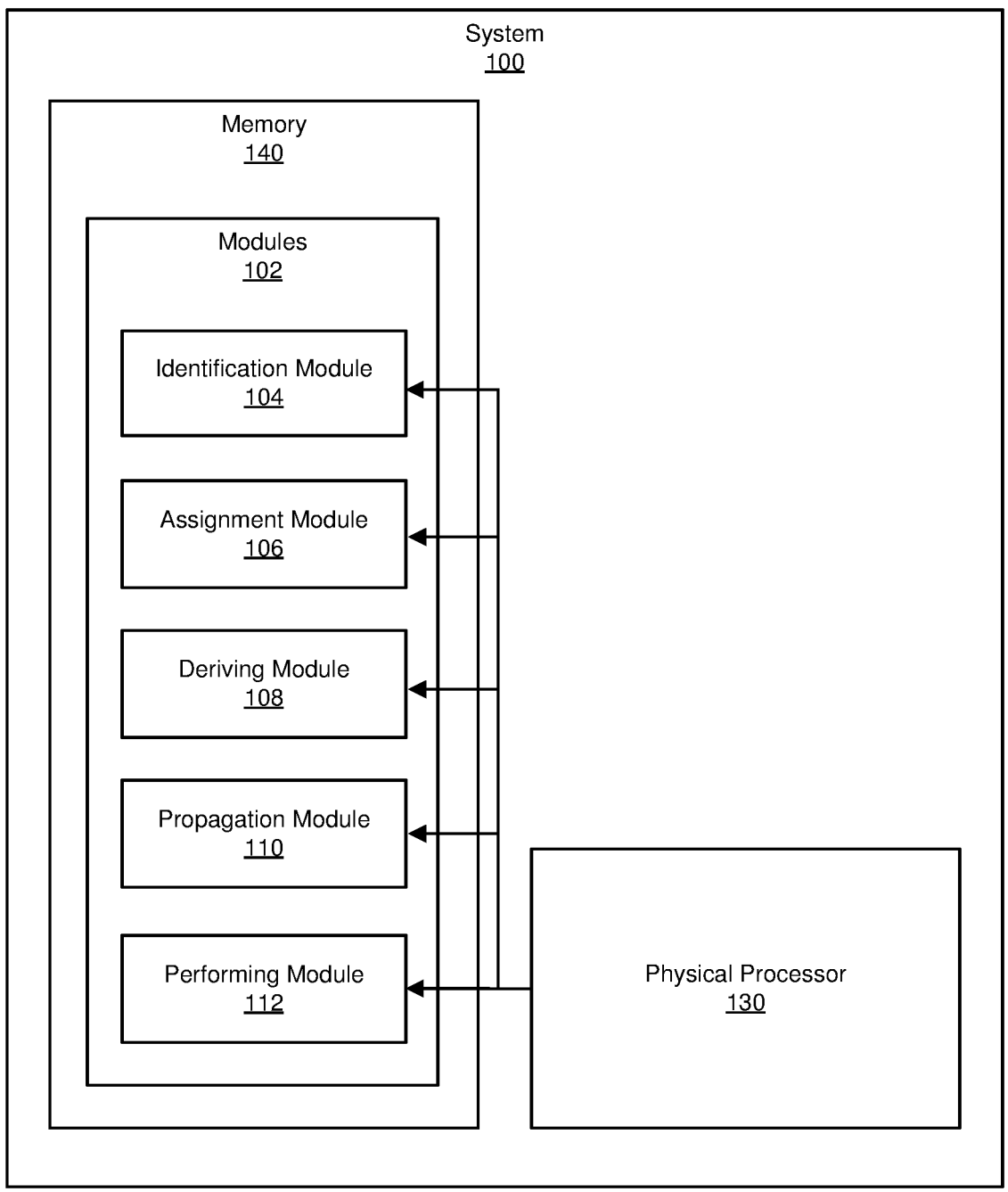
FIG. 1 is a block diagram of an example system for labeling automatically generated reports.

Throughout the drawings, identical reference characters and descriptions indicate similar, but not necessarily identical, elements. While the example embodiments described herein are susceptible to various modifications and alternative forms, specific embodiments have been shown byway of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for labeling automatically generated reports. As will be explained in greater detail below, by performing a mix of unsupervised and supervised learning using data from manually analyzed reports, the systems and methods described herein may be able to accurately differentiate between incident reports that require an analyst's attention and those that do not. By differentiating between reports in this way, the systems and methods described herein may be able to improve the security of a computing system by enabling analysts to respond to severe security incidents without wasting time on trivial incidents. In addition, the systems and methods described herein may improve the functioning of a computing device by detecting potentially malicious incidents with increased accuracy and thus reducing the computing device's likelihood of compromise.

Figure 2:
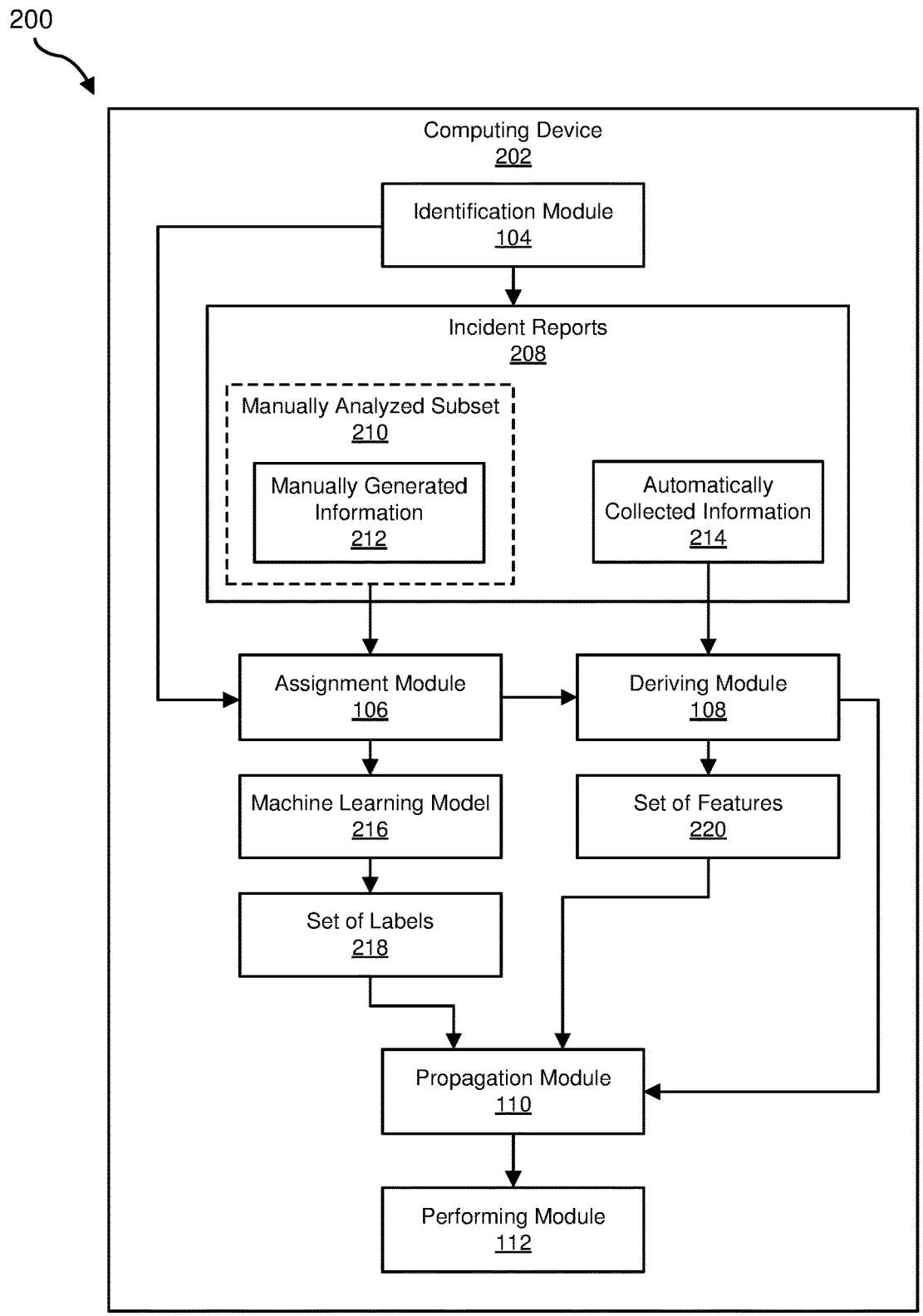
FIG. 2 is a block diagram of an additional example system for labeling automatically generated reports.
Figure 3:
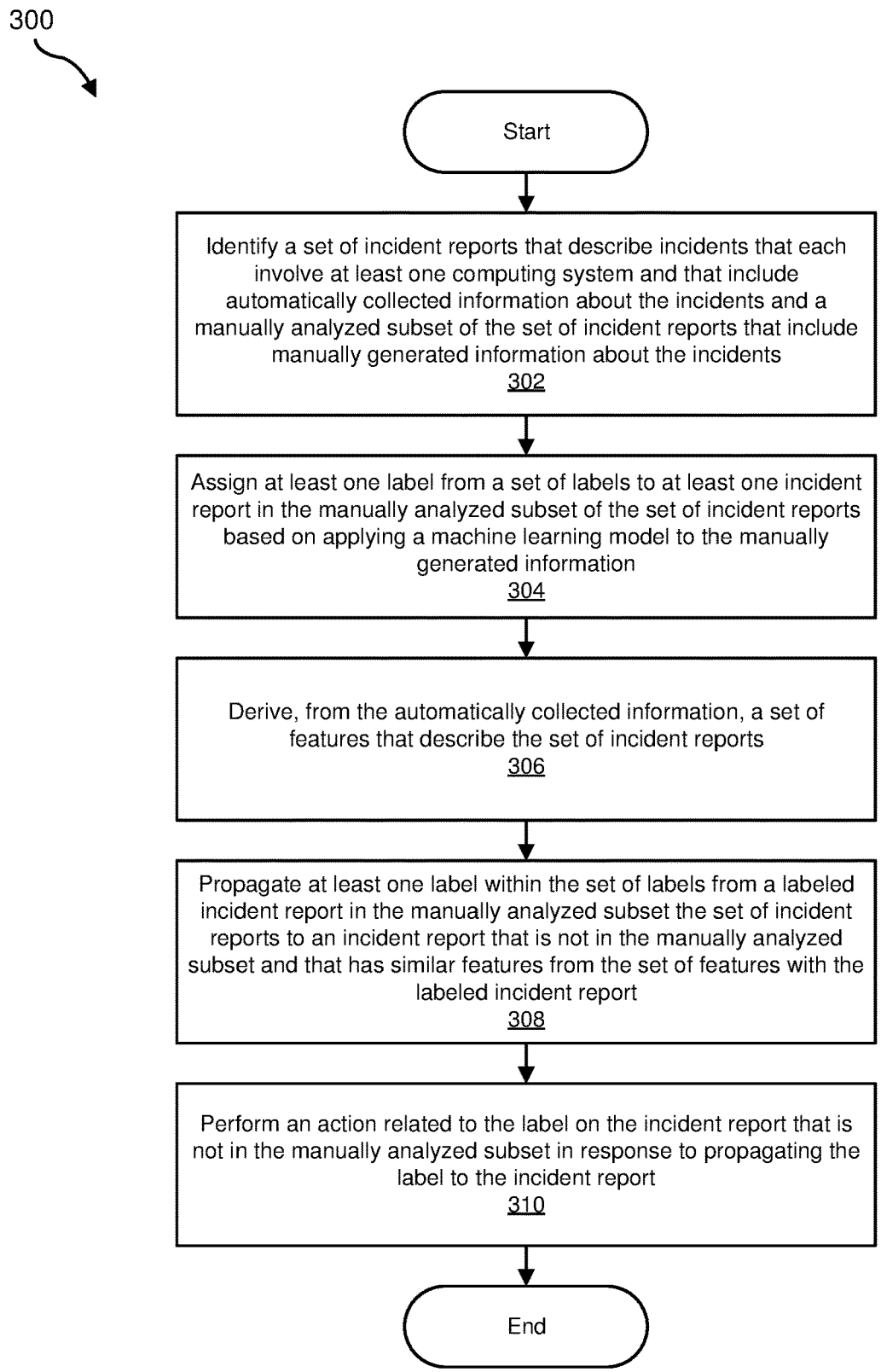
FIG. 3 is a flow diagram of an example method for labeling automatically generated reports.
Figure 4:
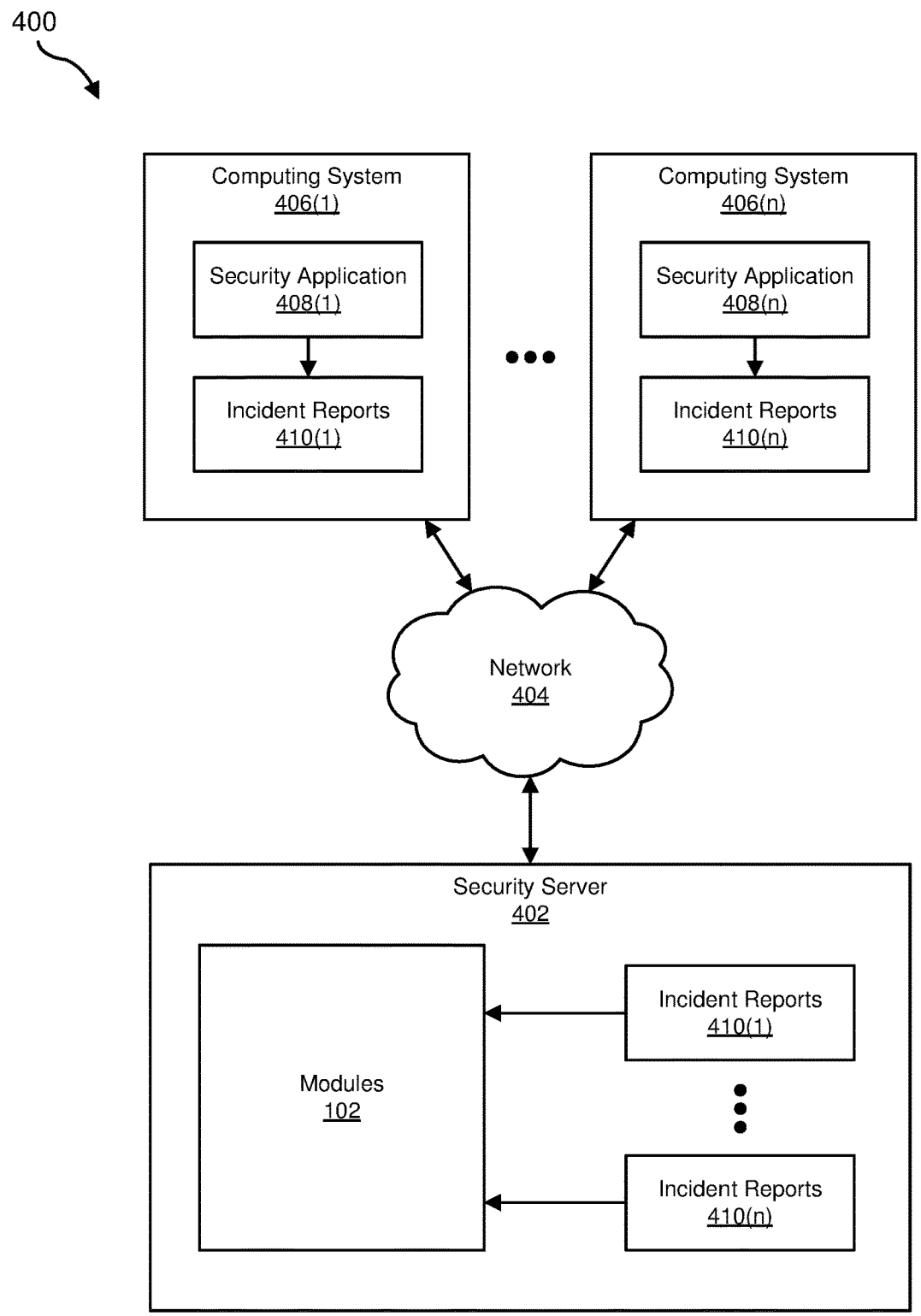
FIG. 4 is a block diagram of an additional example computing system for labeling automatically generated reports.

The following will provide, with reference to FIGS. 1, 2, and 4, detailed descriptions of example systems for labeling automatically generated reports. Detailed descriptions of corresponding computer-implemented methods will also be provided in connection with FIGS. 3 and 5. In addition, detailed descriptions of an example computing system and network architecture capable of implementing one or more of the embodiments described herein will be provided in connection with FIGS. 6 and 7, respectively.

FIG. 1 is a block diagram of example system 100 for labeling automatically generated reports. As illustrated in this figure, example system 100 may include one or more modules 102 for performing one or more tasks. For example, and as will be explained in greater detail below, example system 100 may include an identification module 104 that identifies a set of incident reports that describe incidents that each involve at least one computing system and that include automatically collected information about the incidents and a manually analyzed subset of the set of incident reports that include manually generated information about the incidents. Example system 100 may additionally include an assignment module 106 that assigns at least one label from a set of labels to at least one incident report in the manually analyzed subset of the set of incident reports based on applying a machine learning model to the manually generated information. Example system 100 may also include a deriving module 108 that derives, from the automatically collected information, a set of features that describe the set of incident reports. Example system 100 may additionally include a propagation module 110 that propagates at least one label within the set of labels from a labeled incident report in the manually analyzed subset of the set of incident reports to an incident report that is not in the manually analyzed subset and that includes similar features from the set of features with the labeled incident report. Example system 100 may also include a performing module 112 that performs an action related to the label on the incident report that is not in the manually analyzed subset in response to propagating the label to the incident report. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as computing device 202 in FIG. 2. One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate labeling automatically generated reports. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

Example system 100 in FIG. 1 may be implemented in a variety of ways. For example, all or a portion of example system 100 may represent portions of example system 200 in FIG. 2. As shown in FIG. 2, system 200 may include a computing device 202. In one example, all or a portion of the functionality of modules 102 may be performed by computing device 202 and/or any other suitable computing system. As will be described in greater detail below, one or more of modules 102 from FIG. 1 may, when executed by at least one processor of computing device 202, enable computing device 202 to label automatically generated reports. For example, and as will be described in greater detail below, identification module 104 may identify a set of incident reports 208 that describe incidents that each involve at least one computing system and that include automatically collected information 214 about the incidents and a manually analyzed subset 210 of the set of incident reports that include manually generated information 212 about the incidents. Next, assignment module 106 may assign at least one label from a set of labels 218 to at least one incident report in manually analyzed subset 210 of set of incident reports 208 based on applying a machine learning model 216 to manually generated information 212. Before, after, or at the same time as assignment module 106 assigns labels, deriving module 108 may derive, from the automatically collected information, a set of features 220 that describe set of incident reports 208. After features 220 have been derived and labels 218 assigned, propagation module 110 may propagate at least one label within set of labels 218 from a labeled incident report in manually analyzed subset 210 of set of incident reports 208 to an incident report that is not in manually analyzed subset 210 and that has similar features from set of features 220 with the labeled incident report. Finally, performing module 112 may perform an action related to the label on the incident report that is not in manually analyzed subset 210 in response to propagating the label to the incident report.

Computing device 202 generally represents any type or form of computing device capable of reading computer-executable instructions. In some embodiments, computing device 202 may represent one or more servers capable of aggregating and/or analyzing incident reports. Additional examples of computing device 202 include, without limitation, laptops, tablets, desktops, security servers, application servers, web servers, storage servers, and/or database servers configured to run certain software applications and/or provide various security, web, storage, and/or database services. Although illustrated as a single entity in FIG. 2, computing device 202 may include and/or represent a plurality of servers that work and/or operate in conjunction with one another.

Incident reports 208 generally represent any type of data about events on computing systems. Manually analyzed subset 210 generally represents any incident reports that include data added by one or more humans. Manually generated information 212 generally represents any data added by a human to an incident report. Automatically collected information 214 generally represents any type of data collected about an event on a computing system. Machine learning model 216 generally represents any type or form of machine learning model, technique, and/or algorithm capable of analyzing text. Set of labels 218 generally represents any set containing one or more labels, categories, and/or tags. Set of features 220 generally represents any descriptive attributes of an event on a computing system and/or context surrounding an event on a computing system.

FIG. 3 is a flow diagram of an example computer-implemented method 300 for labeling automatically generated reports. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may identify a set of incident reports that describe incidents that each involve at least one computing system and that include automatically collected information about the incidents and a manually analyzed subset of the set of incident reports that include manually generated information about the incidents. For example, identification module 104 may, as part of computing device 202 in FIG. 2, identify a set of incident reports 208 that describe incidents that each involve at least one computing system and that include automatically collected information 214 about the incidents and a manually analyzed subset 210 of the set of incident reports that include manually generated information 212 about the incidents.

The term "computing system," as used herein, generally refers to any type or form of physical or virtual computing device capable of reading computer-executable instructions and/or any combination of computing devices. Examples of computing systems may include, without limitation, laptops, desktops, tablets, smartphones, embedded systems, smart appliances, servers, virtual machines, containers, firewalls, routers, and/or network switches.

The term "incident," as used herein, generally refers to any type of computing event, combination of computing events, and/or interaction with a computing system by a user. In some examples, an incident may include a security-related event or combination of events, such as events triggered by malicious applications and/or attackers. In some embodiments, an incident may include events on multiple computing systems. For example, an incident may include a virus being transmitted between several computing devices on a network. Examples of incidents may include, without limitation, authentication events, file transfers, data creation, modification, and/or deletion, network connection initiation and/or termination, input from a user, application events, web page events, and/or settings modifications. In some examples, an incident may include multiple events. For example, a brute force attack incident may include multiple failed authentication events. In some embodiments, incidents may be defined by manually and/or automatically created rules that designate certain types and/or combinations of computing events as incidents.

The term "incident report" or "report," as used herein, generally refers to any data about and/or description of an incident. In some embodiments, incident reports may be part of a ticketing system. For example, incident reports may have one or more owners, a status (e.g., open, in progress, closed), and/or other metadata such as a point value.

In some examples, an incident report may include only automatically collected information. The term "automatically collected information," as used herein, generally refers to any information about an incident and/or the context surrounding an incident that may be automatically collected by one or more applications, scripts, and/or modules on a computing system. For example, automatically collected information about a virus infection event may include a timestamp of the event, a uniform resource locator and/or Internet protocol address of the server from which the virus was downloaded, information about the configuration of the infected computing system (e.g., operating system version, installed applications, etc.), logs of activity on the infected computing system, and/or the name and/or signature of the virus.

In some examples, an incident report may include manually generated information in addition to the automatically collected information. The term "manually generated information," as used herein, generally refers to any data added to an incident report by a human. In some embodiments, manually generated information may include text notes, categorization, tags, and/or information from additional applications that is not automatically added to the incident report, such as an event log from an application that does not contribute to incident reports. In some examples, notes added by an analyst may include background information on why an event described in the incident report was triggered, supporting information from internal system logs, supporting information from external resources (e.g., Internet protocol geolocation and/or reputation services), and/or a summary of the analyst's investigation into the incident.

Identification module 104 may identify the incident reports in a variety of ways. For example, identification module 104 may scan a ticketing system for tickets that include incident reports. In some embodiments, identification module 104 may scan multiple ticketing systems for incident reports. Additionally or alternatively, identification module 104 may be part of a system for aggregating incident reports and may identify incident reports within the incident report aggregation system. In some embodiments, identification module 104 may scan a ticketing system that collects tickets generated by multiple computing systems. For example, a ticketing system on a server may aggregate incident reports for incidents that take place on any computing system owned by an organization. In another example, a ticketing system may record incident reports for computing systems that have a particular application installed and/or that are configured with at least one application published by a particular vendor.

In one embodiment, the incidents may include security incidents and the set of incident reports may include incident reports generated by security applications. For example, incident reports may include incidents such as attempted and/or successful attacks on networks and/or computing systems, malware detection, malware activity, malicious bot activity, malicious emails received and/or blocked, and/or compromised computing systems and/or networks. In some embodiments, incident reports may be generated by security applications of various types, such as anti-malware applications, network intrusion prevention systems, firewalls, and/or email filters. In some embodiments, a single incident report may include information from multiple applications. For example, a report about a virus that launched a brute force attack may include information from an anti-virus application and an authentication application.

At step 304, one or more of the systems described herein may assign at least one label from a set of labels to at least one incident report in the manually analyzed subset of the set of incident reports based on applying a machine learning model to the manually generated information. For example, assignment module 106 may, as part of computing device 202 in FIG. 2, assign at least one label from set of labels 218 to at least one incident report in manually analyzed subset 210 of set of incident reports 208 based on applying machine learning model 216 to manually generated information 212.

The term "label," as used herein, generally refers to any description, term, and/or categorization applied to an incident report. In some embodiments, a label may include an alphanumeric string. For example, a label may include a severity category, such as "severe," "moderate," "trivial," and/or "not severe." In other examples, a label may include a type of incident, such as "virus," "network attack," "Trojan," "denial of service attack," and/or "data exfiltration." In some examples, a label may relate to how the incident is to be processed. For example, a label such as "ignore: false positive" may indicate that the incident should not be further analyzed while a label such as "escalate" may incident report should be assigned to an analyst.

The phrase "machine learning model," as used herein, generally refers to any topic modeling and/or sentiment analysis technique that is capable of deriving topics and/or labels from textual documents. In some embodiments, a machine learning model may include a natural language processing technique. In some examples, a machine learning model may include a bag-of-words model that represents one or more documents as an unordered collection of words. In one embodiment, a machine learning model may include a Latent Dirichlet Allocation model that assigns topics to word distributions in documents and uses an iterative process to refine topic assignments until arriving at an accurate assessment of the topics of a document or set of documents and the number of words in each document associated with each topic in the set.

Assignment module 106 may assign labels to incident reports in a variety of ways. For example, assignment module 106 may use the topics generated by a machine learning model as labels and assign labels to incident reports that include words or phrases associated with that topic. For example, assignment module 106 may assign the label "low value incident" and/or "not severe incident" to an incident report that includes notes with the phrase "ignore, malware was blocked," due to the phrase "ignore, malware was blocked" being associated with the topic "low value incident." In another example, assignment module 106 may assign the label "severe incident" to an incident report that includes the words "compromised" and/or "high-risk."

In some embodiments, assignment module 106 may assign only one label to each incident report. In other embodiments, assignment module 106 may assign multiple labels to some or all incident reports. For example, assignment module 106 may assign the labels "severe," "virus," and "home automation" to an incident report that includes the phrase "home network compromised by virus that infected toaster; malicious toaster spread infection to media center."

At step 306, one or more of the systems described herein may derive, from the automatically collected information, a set of features that describe the set of incident reports. For example, deriving module 108 may, as part of computing device 202 in FIG. 2, derive, from the automatically collected information, set of features 220 that describe set of incident reports 208.

The term "feature," as used herein, generally refers to any piece of information included in an incident report. In some examples, a feature may be an aspect of an incident, such as the start time of the incident, the end time of the incident, the type of incident, an identifier of a computing system that precipitated the incident, an identifier of a computing system on which the incident took place, and/or a category of the incident. Additionally or alternatively, a feature may be contextual information surrounding an incident, such as the configuration of a computing system on which the incident took place.

Deriving module 108 may derive the set of features in a variety of ways. For example, deriving module 108 may derive the feature set from the names of data fields in the incident reports. In another example, deriving module 108 may derive the feature set from categories, tags, and/or other metadata associated with the incident reports.

In one embodiment, deriving module 108 may derive, from the automatically collected information, the set of features that describe the set of incident reports by deriving an original set of features from the set of incident reports and refining, using a machine learning model, the original set of features into a reduced set of features that includes a subset of the original set of features that differentiates between incident reports of different types more effectively than the subset of the original features not in the reduced set of features. In some embodiments, deriving module 108 may use an unsupervised machine learning algorithm to perform spectral analysis on the original set of features in order to create a reduced subset of features that effectively discriminate between incident reports of different categories and/or severities. For example, deriving module 108 may use a nonnegative discriminative feature selection model that simultaneously selects features and performs spectral clustering and then iteratively repeats the feature selection and clustering process to create a sparse feature matrix that accurately defines the clusters. In some examples, a nonnegative discriminative feature selection model may impose a nonnegative constraint on the objective function used to create clusters.

Additionally or alternatively, deriving module 108 may use any other suitable machine learning model for feature selection. Examples of other machine learning models may include, without limitation, unsupervised discriminative feature selection, maximum variance, and/or spectral regression.

At step 308, one or more of the systems described herein may propagate at least one label within the set of labels from a labeled incident report in the manually analyzed subset of the set of incident reports to an incident report that is not in the manually analyzed subset and that may include similar features from the set of features with the labeled incident report. For example, propagation module 110 may, as part of computing device 202 in FIG. 2, propagate at least one label within set of labels 218 from a labeled incident report in manually analyzed subset 210 of incident reports 208 to an incident report that is not in manually analyzed subset 210 and that may include similar features from set of features 220 with the labeled incident report.

Propagation module 110 may propagate labels in a variety of ways. In one embodiment, propagation module 110 may propagate labels by plotting each incident report in the set of incident reports on a graph based on at least one value for the incident report of at least one feature in the set of features. In this embodiment, propagation module 110 may propagate a label from a labeled incident report to an unlabeled incident report in response to determining that the labeled incident report and the unlabeled incident report are plotted within a predetermined distance of each other in the graph.

In some examples, propagation module 110 may use a graph created by deriving module 108 rather than creating a new graph. In one example, propagation module 110 may use a graph to identify clusters and/or may propagate labels within clusters. In some embodiments, propagation module 110 may only propagate labels within clusters that are labeled as containing exclusively severe incidents or exclusively not severe incidents and may not propagate labels within clusters that contain a mix of high and low severity incidents. Propagation module 110 may use a variety of models and/or algorithms to identify clusters and/or propagate labels, including, without limitation, k-means clustering, graph-based label propagation algorithms, nearest-neighbor models, and/or self-organizing maps.

At step 310, one or more of the systems described herein may perform an action related to the label on the incident report that is not in the manually analyzed subset in response to propagating the label to the incident report. For example, performing module 112 may, as part of computing device 202 in FIG. 2, perform an action related to the label on the incident report that is not in manually analyzed subset 210 in response to propagating the label to the incident report.

Performing module 112 may perform a variety of actions. For example, performing module 112 may forward the incident report to an analyst for manual analysis. In some embodiments, performing module 112 may determine a specific analyst to whom to assign the incident report. In some examples, propagation module 110 may propagate names of analysts who handled manually analyzed incident reports to incident reports with similar features and performing module 112 may assign incident reports to the analysts indicated by propagation module 110. In some examples, the systems described herein may determine which analyst handled the most recent incident report similar to the new incident report and/or which analyst has handled the most incident reports similar to the new incident report and may assign the new incident report to that analyst.

In some examples, performing module 112 may perform the action by propagating at least one manually added note from the labeled incident report to the incident report. For example, performing module 112 may identify incident reports that have similar labels to a new incident report and/or were analyzed by the same analyst who is now assigned to the new incident report and may copy some or all of the notes from the similar incident reports to the new incident report. Additionally or alternatively, the systems described herein may propagate notes between incident reports with similar features.

In some embodiments, performing module 112 may only forward severe incident reports to analysts and may not forward non-severe incident reports to analysts in order to avoid overburdening analysts with reports about incidents that are benign and/or handled by automatic systems. For example, performing module 112 may perform the action by forwarding the incident report labeled as severe to an analyst for manual analysis in response to labeling the incident report as severe and/or avoiding forwarding the additional incident report labeled as not severe to an analyst for manual analysis in response to labeling the additional incident report as not severe.

In some embodiments, the systems described herein may receive incident reports about security-related incidents on a large number of computing systems on many different networks. For example, as illustrated in FIG. 4, modules 102 may be hosted on a security server 402 that may communicate with computing systems 406(1)-406($n$) via one or more networks 404. In some embodiments, computing systems 406(1)-406($n$) may be connected to a variety of local area networks that are connected to security server 402 via the Internet. In some examples, computing systems may be configured with security applications 408(1)-408($n$) that create incident reports 410(1)-410($n$), respectively. In some embodiments, some computing systems within computing systems 406(1)-406($n$) may be configured with more than one security application that contributes to incident reports 410(1)-410($n$). In one embodiment, modules 102 on security server 402 may receive incident reports 410(1)-410($n$), use manually generated information within incident reports 410 (1)-410($n$) to label manually analyzed incident reports, and propagate the labels to unlabeled incident reports within incident reports 406(1)-406($n$) and/or new incident reports that are received at a later time. In some examples, modules 102 on security server 402 may forward incident reports labeled as severe to analysts for manual analysis. In some embodiments, analysts may access the incident reports on security server 402. In other embodiments, analysts may access the incident reports on other computing devices, such as laptops and desktops in communication with security server 402.

Figure 5:
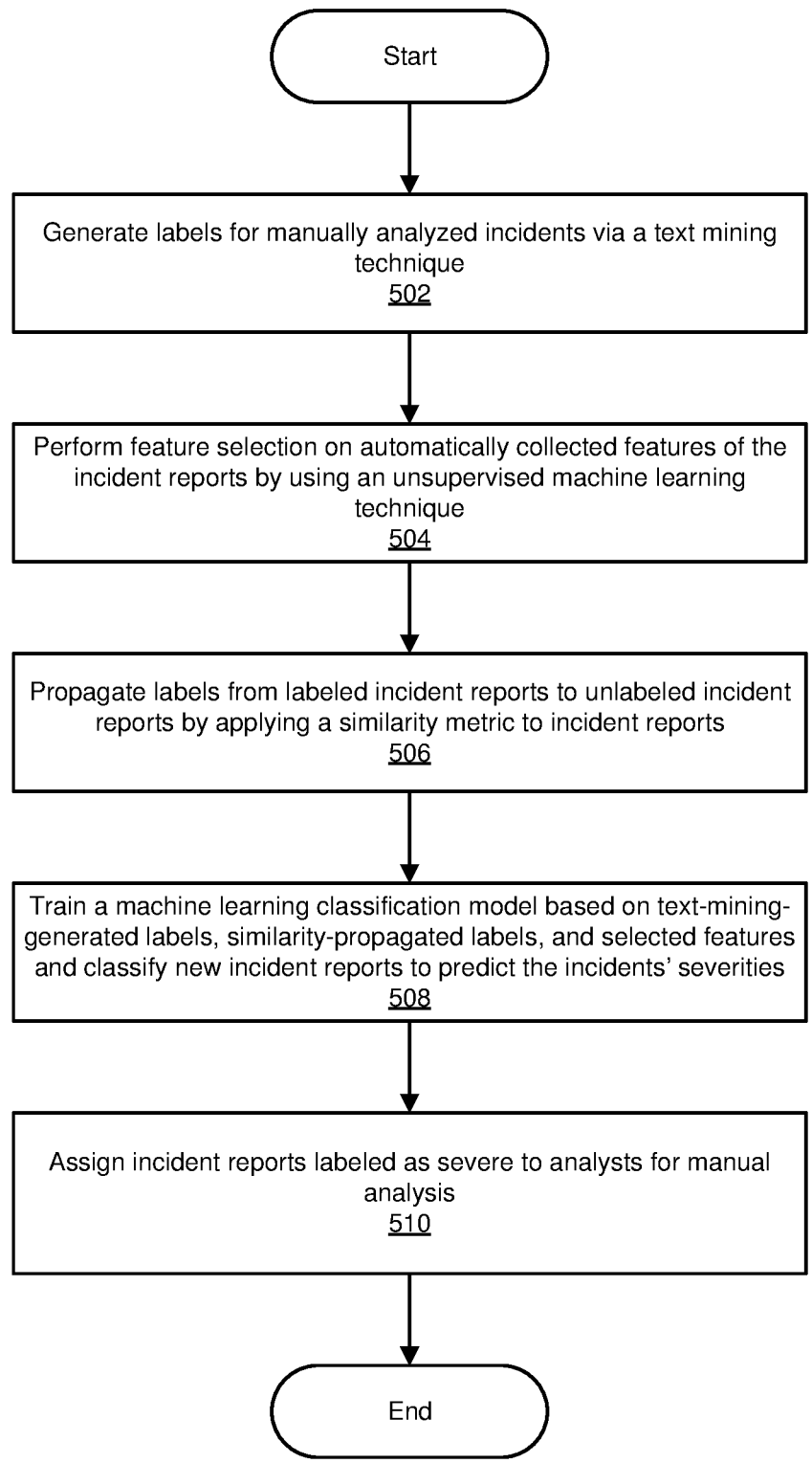
FIG. 5 is a flow diagram of an additional example method for labeling automatically generated reports.

In some embodiments, the systems described herein may use a variety of supervised and/or unsupervised machine learning techniques in order to classify automatically generated security incident reports and send severe incident reports to analysts for further analysis. As illustrated in FIG. 5, at step 502, the systems described herein may generate labels for manually analyzed incidents via a text mining technique such as topic modeling, keyword extraction, and/ or sentiment analysis. For example, the systems described herein may use a Latent Dirichlet Allocation model to identify at-risk computing systems based on information in incident reports about those computing systems and/or categorize incident reports into sub-categories based on type and/or severity. At step 504, the systems described herein may perform feature selection on automatically collected features of the incident reports by using an unsupervised machine learning technique. For example, the systems described herein may use a nonnegative discriminative feature selection method that performs graph-based spectral clustering to learn the similarity relationship of the input samples, during which feature selection is performed simultaneously to exploit the discriminative information in an unsupervised way so that the selected features will maintain the original graph similarity structure as much as possible. In some examples, the systems described herein may reduce the feature set by a significant portion, such as 50% of the original size.

At step 506, the systems described herein may propagate labels from labeled incident reports to unlabeled incident reports by applying a similarity metric to incident reports. For example, the systems described herein may establish a similarity metric based on the distance measures of step 504 and use the similarity metric to identify incident reports that are similar to labeled incident reports. In some embodiments, the systems described herein may propagate labels only when the neighborhood of the incident consists only of high-value or low-value security issues, and not a mixture of both. In some embodiments, the systems described herein may also propagate manually entered notes while propagating labels. In some examples, at step 508, the systems described herein may train a machine learning classification model based on text-mining-generated labels, similarity-propagated labels, and selected features and/or classify new incident reports to predict the incidents' severities. In one embodiment, the systems described herein may build a model on current features and labels and, when new incident reports arrive, quickly assign a severity score to the new incident reports for use by security analysts. At step 510, the systems described herein may assign incident reports labeled as severe to analysts for manual analysis. In some embodiments, the systems described herein may assign severe incident reports to analysts who recently handled incident reports with similar labels, features, and/or characteristics. In some embodiments, the systems described herein may repeat steps 502 and/or 504 with the newly labeled data produced by step 506 and/or perform some other type of supervised learning on the labeled incident reports produced by step 506.

As explained in connection with method 300 above, the systems and methods described herein may enable analysts to prioritize which incidents to investigate without being distracted by large amounts of false positives, or missing potentially dangerous false negatives, by propagating information entered by analysts about previous incident reports to incident reports with similar features and forwarding incident reports categorized as serious to appropriate analysts. In some examples, the systems and methods described herein may enable an enterprise's cyber security operation center (SOC) to quickly identify severe security incidents that require intervention. The systems and methods described herein may differentiate high severity security incidents from run-of-the-mill security incidents by mining SOC analyst comments using sentiment and topic analysis and correlating similar severe incidents. By analyzing previous incident reports and applying the information to un-analyzed reports in this way, the systems and methods described herein may enable better prioritization and/or provide analysis efficiencies and improved queue management.

Figure 6:
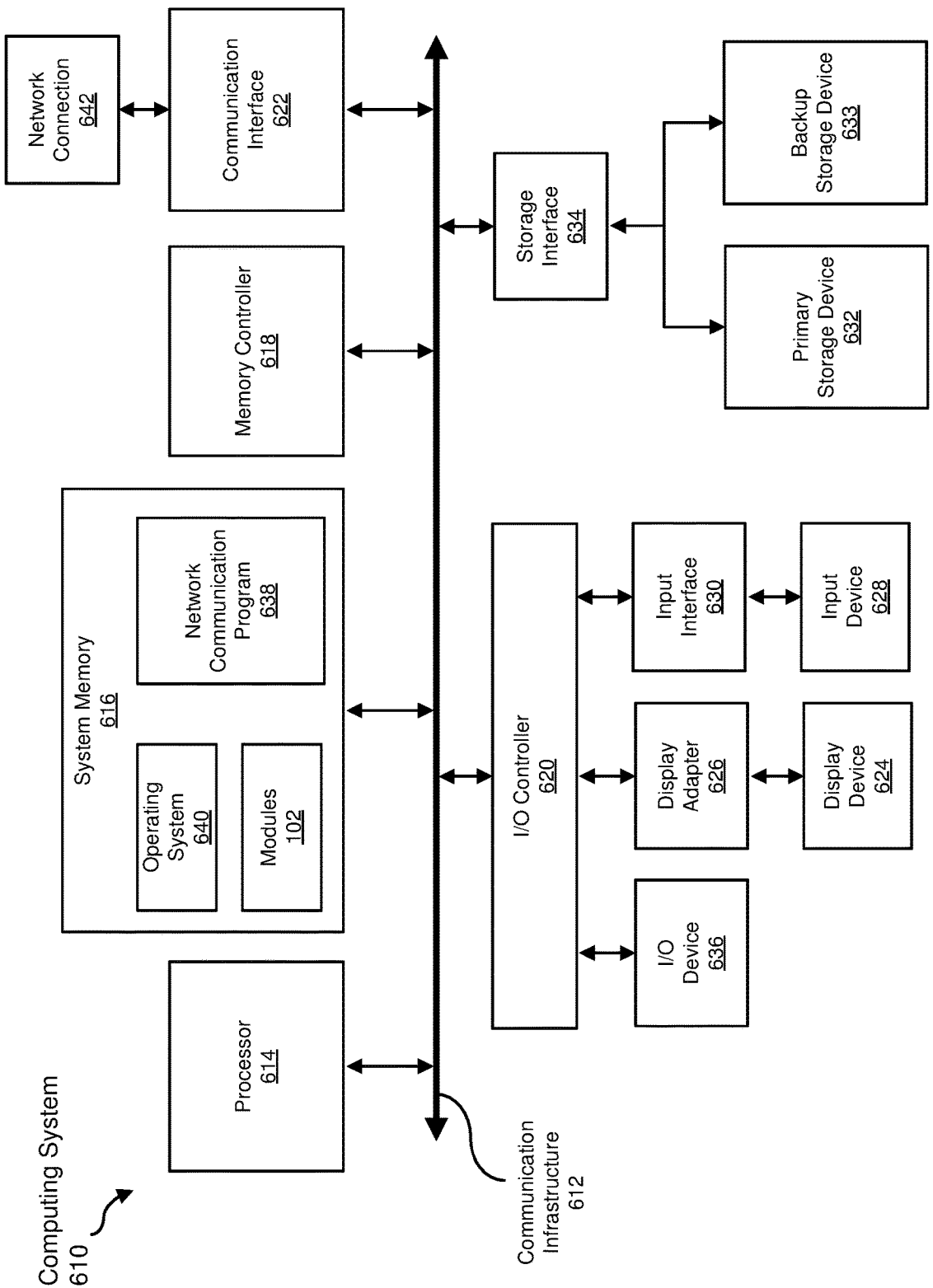
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 640 for execution by processor 614. In one example, operating system 640 may include and/or represent software that manages computer hardware and software resources and/or provides common services to computer programs and/or applications on computing system 610. Examples of operating system 640 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
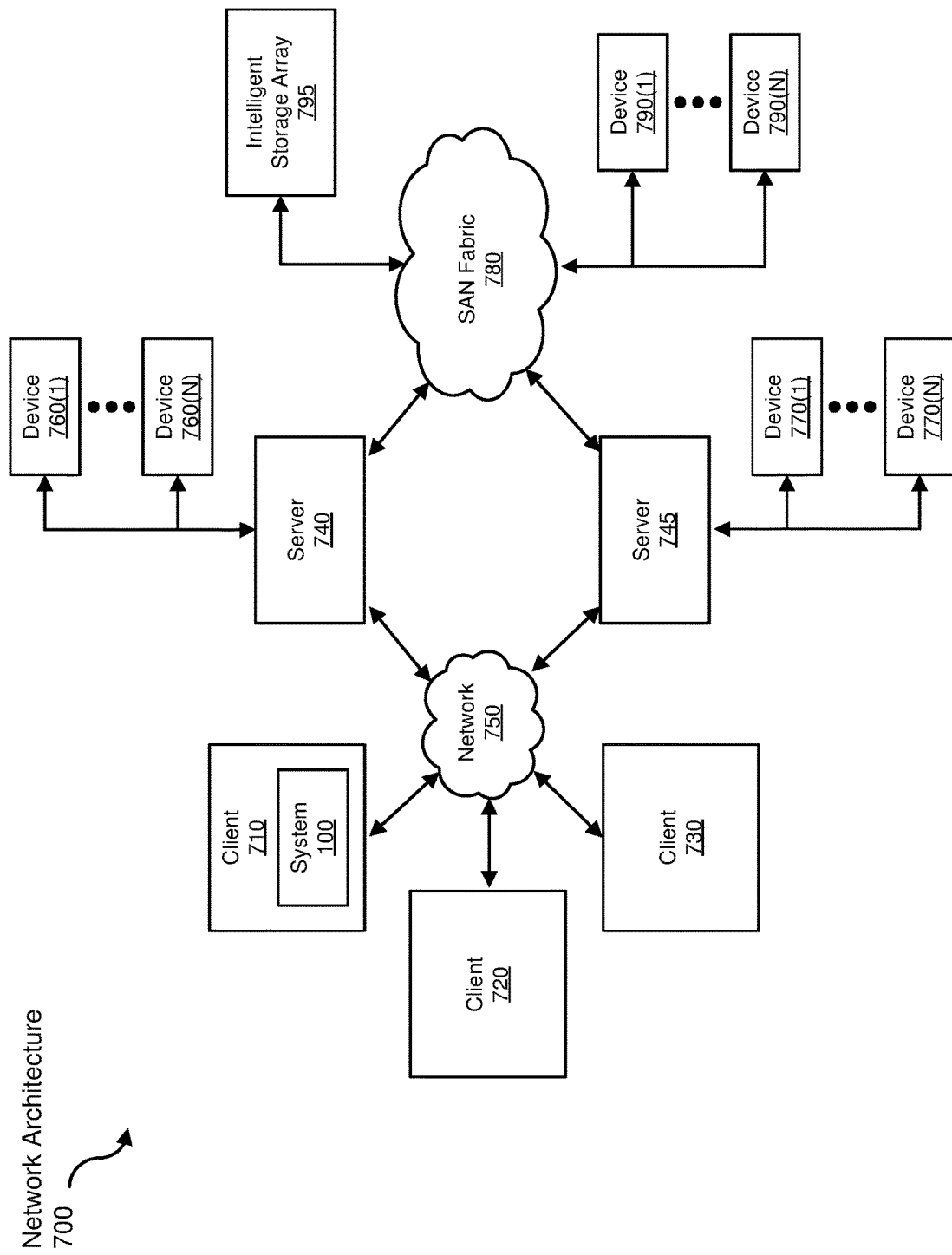
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for labeling automatically generated reports.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive incident report data to be transformed, transform the incident report data into one or more machine learning models, output a result of the transformation to one or more machine learning algorithms, use the result of the transformation to propagate labels and/or notes between incident reports, and store the result of the transformation to memory. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for labeling automatically generated reports, at least a portion of the method being performed by a computing device comprising at least one processor, the method comprising:
    identifying:
        a set of incident reports that describe incidents that each involve at least one computing system and that comprise automatically collected information about the incidents; and
        a manually analyzed subset of the set of incident reports that further comprise manually generated information about the incidents in addition to automatically collected information about the incidents;
    assigning at least one label from a set of labels to at least one incident report in the manually analyzed subset of the set of incident reports, wherein the set of labels was generated based on applying a machine learning model to the manually generated information;
    deriving, from the automatically collected information, a set of features that describe the set of incident reports wherein each feature in the set of features discriminates between differing types of incident reports;
    plotting each incident report in the set of incident reports on a graph based on at least one value for the incident report of at least one feature in the set of features;
    in response to determining that the labeled incident report and the incident report comprise similar features from the set of features by determining that the labeled incident report and the incident report are plotted within a predetermined distance of each other in the graph, propagating at least one label assigned to a labeled incident report in the manually analyzed subset of the set of incident reports to an incident report that is not in the manually analyzed subset; and
    performing an action related to the label on the incident report that is not in the manually analyzed subset in response to propagating the label to the incident report.

2. The computer-implemented method of claim 1, wherein performing the action comprises forwarding the incident report to an analyst for manual analysis.

3. The computer-implemented method of claim 1, wherein performing the action comprises propagating at least one manually added note from the labeled incident report to the incident report.

4. The computer-implemented method of claim 1, wherein the incidents comprise security incidents and the set of incident reports comprises incident reports generated by security applications.

5. The computer-implemented method of claim 1, wherein assigning the at least one label from a set of labels to the at least one incident report in the manually analyzed subset of the set of incident reports based on applying the machine learning model to the manually generated information comprises analyzing the manually generated information using a natural language processing technique.

6. The computer-implemented method of claim 1, wherein deriving, from the automatically collected information, the set of features that describe the set of incident reports comprises:
  deriving an original set of features from the set of incident reports; and
  refining, using a machine learning model, the original set of features into a reduced set of features that comprises a subset of the original set features that differentiates between incident reports of different types more effectively than a subset of the original features not in the reduced set of features.

7. The computer-implemented method of claim 1, wherein assigning the at least one label from a set of labels to the at least one incident report in the manually analyzed subset of the set of incident reports comprises:
  labeling the at least one incident report in the manually analyzed subset as severe; and
  labeling at least one additional incident report in the manually analyzed subset as not severe.

8. The computer-implemented method of claim 7, wherein performing the action comprises at least one of:
  forwarding the incident report labeled as severe to an analyst for manual analysis in response to labeling the incident report as severe; and
  avoiding forwarding the additional incident report labeled as not severe to an analyst for manual analysis in response to labeling the additional incident report as not severe.

9. A system for labeling automatically generated reports, the system comprising:
  an identification module, stored in memory, that identifies:
    a set of incident reports that describe incidents that each involve at least one computing system and that comprise automatically collected information about the incidents; and
    a manually analyzed subset of the set of incident reports that further comprise manually generated information about the incidents in addition to automatically collected information about the incidents;
  an assignment module, stored in memory, that assigns at least one label from a set of labels to at least one incident report in the manually analyzed subset of the set of incident reports, wherein the set of labels was generated based on applying a machine learning model to the manually generated information;
  a deriving module, stored in memory, that derives, from the automatically collected information, a set of features that describe the set of incident reports, wherein each feature in the set of features discriminates between differing types of incident reports;
  a propagation module, stored in memory, that propagates at least one label assigned to a labeled incident report in the manually analyzed subset of the set of incident reports to an incident report that is not in the manually analyzed subset and that comprises similar features from the set of features with the labeled incident report by:
    plotting each incident report in the set of incident reports on a graph based on at least one value for the incident report of at least one feature in the set of features; and
    propagating the at least one label from the labeled incident report to the incident report in response to determining that the labeled incident report and the incident report are plotted within a predetermined distance of each other in the graph;
  a performing module, stored in memory, that performs an action related to the label on the incident report that is not in the manually analyzed subset in response to propagating the label to the incident report; and
  at least one physical processor configured to execute the identification module, the assignment module, the deriving module, the propagation module, and the performing module.

10. The system of claim 9, wherein the performing module performs the action by forwarding the incident report to an analyst for manual analysis.

11. The system of claim 9, wherein the performing module performs the action by propagating at least one manually added note from the labeled incident report to the incident report.

12. The system of claim 9, wherein the incidents comprise security incidents and the set of incident reports comprises incident reports generated by security applications.

13. The system of claim 9, wherein the assignment module assigns the at least one label from a set of labels to the at least one incident report in the manually analyzed subset of the set of incident reports based on applying the machine learning model to the manually generated information by analyzing the manually generated information using a natural language processing technique.

14. The system of claim 9, wherein the deriving module derives, from the automatically collected information, the set of features that describe the set of incident reports by:
  deriving an original set of features from the set of incident reports; and
  refining, using a machine learning model, the original set of features into a reduced set of features that comprises a subset of the original set features that differentiates between incident reports of different types more effectively than a subset of the original features not in the reduced set of features.

15. The system of claim 9, wherein the assignment module assigns the at least one label from a set of labels to the at least one incident report in the manually analyzed subset of the set of incident reports by:
  labeling the at least one incident report in the manually analyzed subset as severe; and
  labeling at least one additional incident report in the manually analyzed subset as not severe.

16. The system of claim 15, wherein the performing module performs the action by at least one of:
  forwarding the incident report labeled as severe to an analyst for manual analysis in response to labeling the incident report as severe; and avoiding forwarding the additional incident report labeled as not severe to an analyst for manual analysis in response to labeling the additional incident report as not severe.

17. A non-transitory computer-readable medium comprising one or more computer-readable instructions that, when executed by at least one processor of a computing device, cause the computing device to:

identify:
- a set of incident reports that describe incidents that each involve at least one computing system and that comprise automatically collected information about the incidents; and
- a manually analyzed subset of the set of incident reports that further comprise manually generated information about the incidents in addition to automatically collected information about the incidents;

assign at least one label from a set of labels to at least one incident report in the manually analyzed subset of the set of incident reports, wherein the set of labels was generated based on applying a machine learning model to the manually generated information;

derive, from the automatically collected information, a set of features that describe the set of incident reports wherein each feature in the set of features discriminates between differing types of incident reports;

plot each incident report in the set of incident reports on a graph based on at least one value for the incident report of at least one feature in the set of features;

in response to determining that the labeled incident report and the incident report comprise similar features from the set of features by determining that the labeled incident report and the incident report are plotted within a predetermined distance of each other in the graph, propagate at least one label assigned to a labeled incident report in the manually analyzed subset of the set of incident reports to an incident report that is not in the manually analyzed subset and that comprises similar features from the set of features with the labeled incident report; and perform an action related to the label on the incident report that is not in the manually analyzed subset in response to propagating the label to the incident report.

18. The non-transitory computer-readable medium of claim 17, wherein the one or more computer-readable instructions cause the computing device to perform the action by forwarding the incident report to an analyst for manual analysis.

19. The non-transitory computer-readable medium of claim 17, wherein performing the action comprises propagating at least one manually added note from the labeled incident report to the incident report.

20. The non-transitory computer-readable medium of claim 17, wherein the incidents comprise security incidents and the set of incident reports comprises incident reports generated by security applications.

* * * * *